United States Patent

[11] 3,611,944

| [72] | Inventor | Otto Reder<br>Baden-Baden, Germany |
|---|---|---|
| [21] | Appl. No. | 803,619 |
| [22] | Filed | Mar. 3, 1969 |
| [45] | Patented | Oct. 12, 1971 |
| [73] | Assignee | Messerschmitt-Bolkow GmbH<br>Ottobrunn bei Munich, Germany |
| [32] | Priority | Mar. 6, 1968 |
| [33] | | Germany |
| [31] | | P 16 80 357.9 |

[54] SUSPENDED VEHICLE CONSTRUCTION
15 Claims, 3 Drawing Figs.

[52] U.S. Cl. .................................................. 104/23 FS,
104/148 LM, 104/134, 104/148 MS
[51] Int. Cl. ............................................... B61b 13/08
[50] Field of Search ............................................. 104/23 FS,
148 MS, 148 LM, 89; 105/155

[56] References Cited
UNITED STATES PATENTS

| 3,500,765 | 3/1970 | Easton | 104/148 LM |
| 3,198,139 | 8/1965 | Dark | 104/148 MS |
| 3,125,964 | 3/1964 | Silverman | 104/148 MS |
| 3,225,228 | 12/1965 | Roshala | 104/148 LM |
| 2,013,703 | 9/1935 | Strauss | 104/89 |
| 994,519 | 3/1911 | Ifft | 105/155 |
| 935,780 | 12/1908 | Dahlin | 105/155 |

Primary Examiner—Arthur L. La Point
Assistant Examiner—D. W. Keen
Attorney—McGlew and Toren ABSTRACT: A ground or top supported tracked vehicle includes a carriage which is suspended above a trackway by air pressure or magnetic force and which is moved along the trackway and braked by a linear electric induction motor. The carriage is supported in spaced relationship to a curved track or rail by the air pressure gap or the magnetic force gap and is maintained during motion without ground or track contact. The carriage is constructed to pivot from a pendular hinge for lateral swinging movement. The pendular axis is located above the center of gravity of the carriage and is advantageously formed at the lower end of an induction motor or as one of the moving parts of the motor. The construction includes sliding pads or rollers which run along a substantially vertically arranged electroconductive reaction rail without being supported vertically on the rail.

PATENTED OCT 12 1971

INVENTOR
Otto Reder

By McGlew & Toren
ATTORNEYS

INVENTOR
Otto Reder

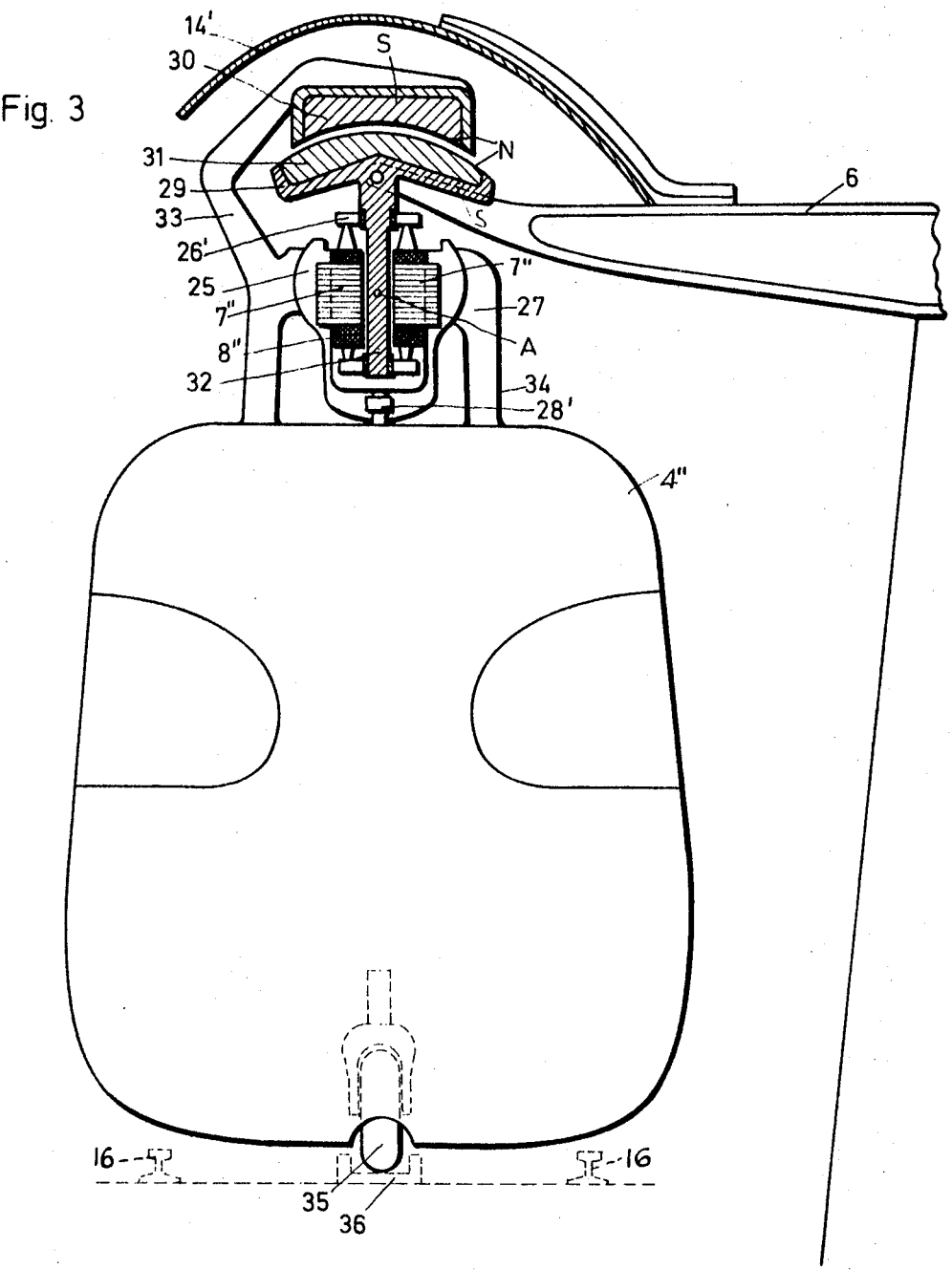

3,611,944

SUSPENDED VEHICLE CONSTRUCTION

SUMMARY OF THE INVENTION

This invention relates, in general to the construction of vehicles and, in particular, to a new and useful ground or top supported tracked vehicle which is adapted to be suspended on air pressure or magnetic force bearings and driven by a linear induction motor.

The invention relates to a vehicle which is adapted to move along a defined trackway and which obtains its suspension from air pressure or magnetic force acting on the vehicle to hold it off its supporting elements during operation. The vehicle is of a type which is adapted to be driven and braked by linear electric induction motor. Tracked vehicles suspended on air pressure or magnetic force bearings and driven by electric induction motors have been known before. However, no such vehicles are known which have the ability of swinging into a natural side inclination while a reaction rail which transmits the driving and braking force of the linear induction motor pole elements maintains rigidity of the carriage in its vertical position. Known vehicles require troublesome track shapes with additional vertical air pressure or magnetic bearing forces to take care of the guidance forces during the movement of the vehicle. Guide wheels or sliding paths are required to make sure that the airgap between the metallic reaction rail and the magnetic yokes of the linear motor is kept within a constant minimum.

In accordance with the present invention, a lightly loaded reaction rail is employed and guide wheels or pads which are lightly loaded are provided for the guidance of the whole vehicle. The carriage of the vehicle is arranged to pivot about a hinging joint between the parts of the magnetic yoke of the linear motor and the carriage itself. The pivotal point is located in a manner to permit the carriage to perform a pendular lateral movement into a natural inclination during the movement of the vehicle around a curve. The pendular axis of the construction does not support any weight of the carriage since this is supported by the air pressure or magnetic bearings which glide free of contact over a trackway. The track is provided with an arched circular surface so that the carriage is able to perform an autostabilizing lateral pendular movement during its operation.

Accordingly, it is an object of the invention to provide an improved ground or top supported tracked vehicle which is suspended on air pressure or magnetic force pressure and which is driven and braked by one or more linear induction motors, the carriage of the vehicle being supported so that it may be pivoted laterally in a natural pendular motion.

A further object of the invention is to provide a vehicle which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the Drawings:

FIG. 3 is a view similar to FIG. 1 of still another embodiment of the invention.

DETAILED DESCRIPTION OF THE PREFERRED EMBODIMENTS

Figure 1:
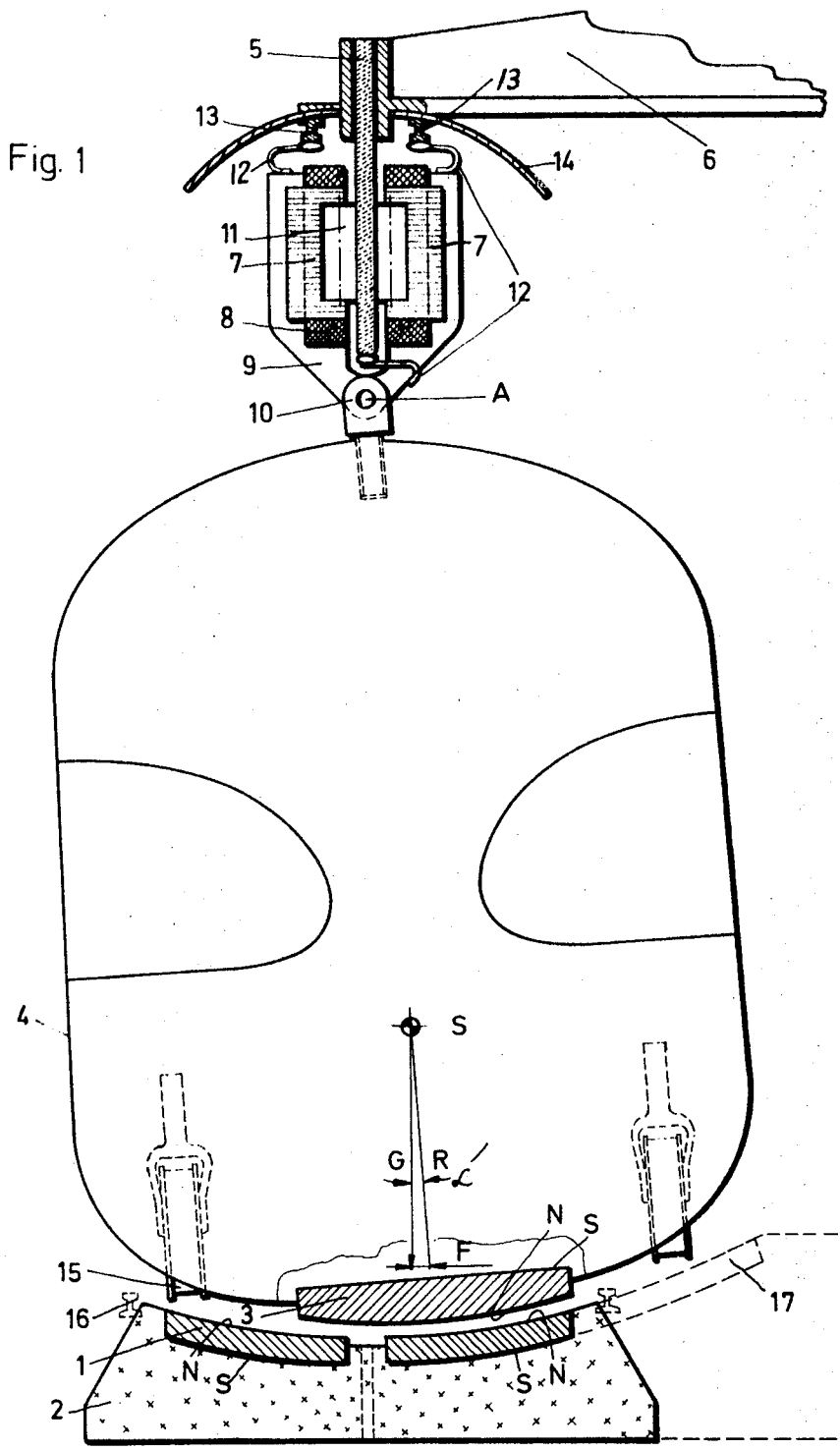
FIG. 1 is a partial and elevational view and partial transverse sectional view of a vehicle constructed in accordance with the invention.

Referring to the drawings, in particular, the invention embodied therein in FIG. 1 comprises a vehicle which is adapted to run over a track having a circular surface formed by magnetic bricks 1, mounted along a concrete bed 2. The magnetic bricks 1 comprise sintered compounds of ferrite or similar materials which are arranged to cooperate with opposite magnets 3 of the same or similar material and which are carried at the underside of a carriage 4 of the vehicle. The polarities of the magnets 1 on the trackway and the magnets 3 on the vehicle carriage are arranged opposite so that a North pole is arranged opposite to a North pole and a South pole opposite to a South pole. Magnets of this type are capable of delivering separating pressures which are approximately equal to 614 pounds per square foot.

In accordance with a feature of the invention, the vehicle is driven and braked by a linear electric induction motor which is situated above the roof of the carriage 4.

The electric induction motor includes an electroconductive metal rail or reaction rail 5 which is built up of a material such as aluminum alloys or the like. The rail 5 is supported by carrier arms 6 above the middle of the lower track 1, 2. The rail 5 is sandwiched between magnetic yoke poles 7, 7 of the induction motor to leave a small airgap therebetween. The magnetic poles 7 are activated by moving magnetic fields which are induced by two or three-phase alternate currents fed into the windings or coils 8. The coils 8 are shown in section. An example of a linear induction motor is referred to in E. R. Laithwaite "Linear Induction Motors As Take-off Assistance" interavia 8–1962 page 1029, and 1030.

The moving magnetic fields produce driving forces or braking forces as desired on the magnetic poles 7. The poles 7 are imbedded in a lightweight casing formed of a plastic material or of a light metal alloy. The casing 9 has a central depending portion carrying a pivot 10 which articulates the carriage 4 to the induction motor.

Guide rollers 11 are provided on each side of the magnetic pole yokes 7 and they bear against the rail 5. The rollers 11 are arranged to ensure a constant airgap between the yokes 7 and the reaction rail 5. The rollers 11 take over the guidance of the whole vehicle around curves and provide a reinforcement against side forces of the wind.

A pair of resilient loaded rolling conductors 12 are arranged on each side of the top of the casing 9 and bear against respective conductor rails 13, 13 which supply the electric current for the driving operation. An additional rolling contact 12 is carried at the lower end of the casing and it bears upwardly against the rail 5. The reaction rail 5 may also be used for conducting electricity if it is insulated from the arm 6.

The magnetic yokes 7, 7 are free to move in a vertical direction parallel to the rail 5. Therefore, the yokes 7 do not transmit suspension forces but only driving, braking and lateral guiding forces.

The vehicle represents a virtual pendulum which swings about an axis A of the hinge 10 without being suspended from it. On curves with a radius $r$ and a banking angle $\alpha$ the following relationship is obtained:

$$tg\alpha = F/G = V^2/gr_2 \quad , \text{where}$$

$G=$ weight of carriage concentrated at its center of gravity
$F=$ centrifugal force
$V=$ speed of vehicle
$g=$ acceleration due to gravitation.

For sharp curves, the circular track can be widened by the placing of additional magnetic bricks 17 in an extension of the concrete bed 2. The reaction rail may be protected against snow or ice by a roof cover 14.

In some instances, it is desirable to carry retractible undercarriages 15 with tracking wheels which are engageable with track elements 16 of an ordinary railway track, particularly for the transport and maneuvering of the vehicle inside of cities, for example. In such a case, the vehicle is capable of riding a on wheels over a normal railway on the rails 16 or over a smooth-cemented track and in each case it is braked and guided by the overhead induction motor. Naturally, no magnetic bricks 1 or 3 are required when the wheels 15 are mounted for movement on the trackway 16.

Figure 2:
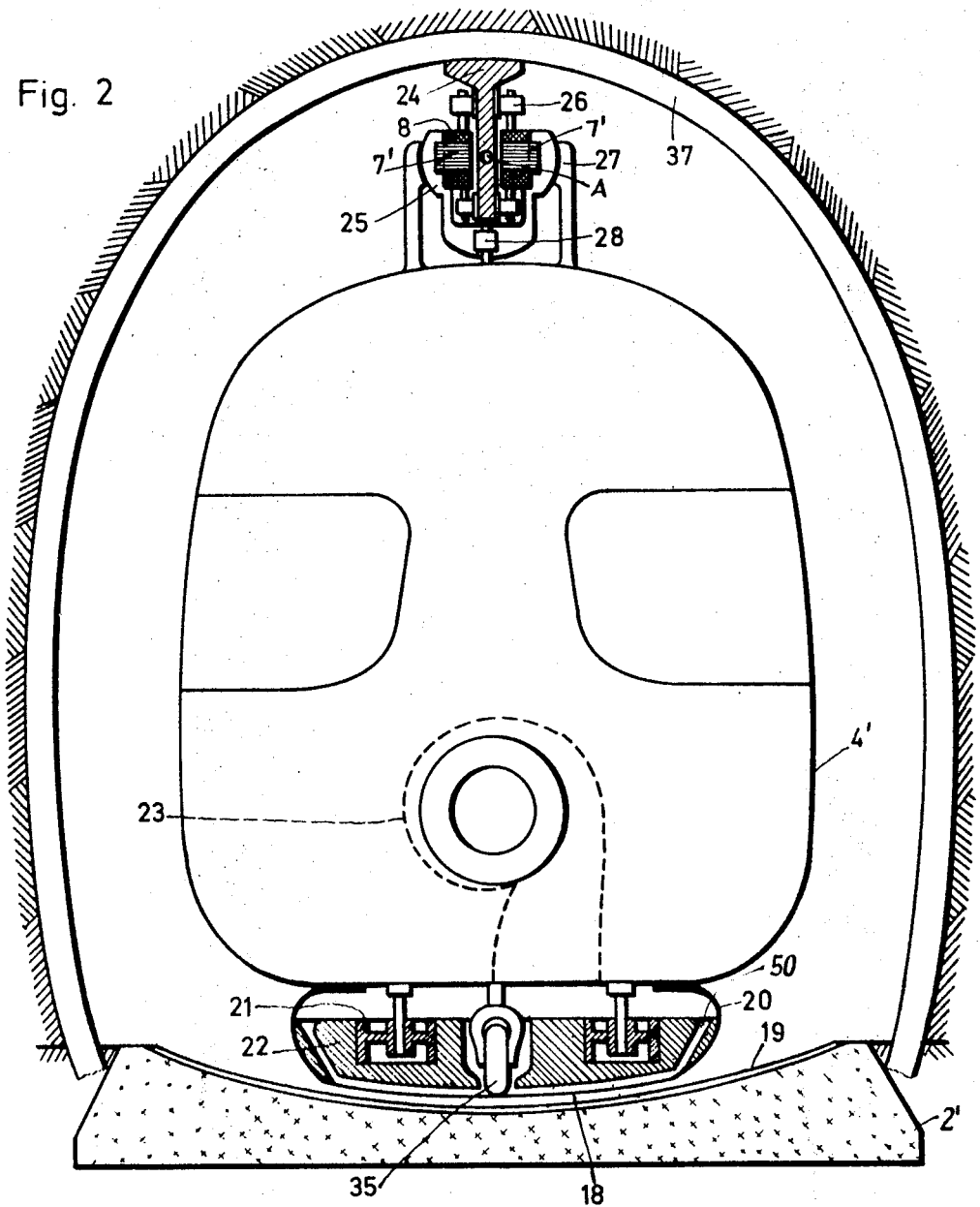
FIG. 2 is a view similar to FIG. 1 of another embodiment of the invention.

In the embodiment indicated in FIG. 2, there is provided a vehicle having a carriage 4' which is adapted to be supported by a cushion of air supplied outwardly into a narrow gap 18 defined over a concrete bed 2' and below the carriage 4. The concrete bed 2' defines a circular track 19 having a smooth surface. Arched gliding pads 22 are carried on the underside of the carriage 4' and they are supported by shock absorbers 21 which are surrounded by flexible skirts 20. Air under pressure is delivered by a blower or air compressor 23 which is mounted centrally within the carriage 4' and which discharges into ducts 50 which are inclined inwardly to direct the air under the vehicle to support it above the shoes or pads 22.

The linear induction motor for the carriage 4' in this embodiment comprises a T-shaped reaction rail 24 which is mounted in a position to depend from an arched support 37 in a tunnel or similar location. Magnetic yokes or poles 7', 7' are arranged on each side of the rail 24 and they are carried in a casing 25 along with induction coils 8. The casing 25 and, consequently, the whole carriage 4 is guided by rollers 26 which are mounted on extensions of the casings 25 and which bear against the reaction rail 24. The rollers 26 are preferably arranged to travel along conductive portions of the rail 25 which are bounded by insulating materials and secured to the reaction rail 24.

The casing 25 is provided with hemispherical outer portions and it is supported on upright elements or a socket member 27 carried at the upper edge of the carriage 4'. The connection provides a hinge axis A in the vertical center plane of the reaction rail 24 which provides articulation of the carriage in a manner similar to the first embodiment. When the carriage moves around curve, it will swing laterally like a pendulum around the axis A. The axis A also forms a center of the circle forming the arched track 19.

Driving and braking forces are transmitted by the pressure rollers 28 or similar gliding pads from the induction motor to the carriage 4' and they do not impede the pendulum movement. The pressure rollers 28 may be replaced by interengaging portions such as a projection and groove and interengaging teeth formed on the casing 25 and the upright support 27. The ball and socket type joint which has been described forms a very favorable pivoting arrangement for a suitable high positioning of the pendular axis A.

In the embodiment indicated in FIG. 3, there is provided a carriage 4" and it is supported by an overhead trackway or T-shaped rail 29 formed of an electroconductive light metal. An arched set of magnetic blocks 31 are carried at the upper end of the rail 29 and the lower leg 32 of the rail provides a reactor rail.

Magnets 30 are suspended from curved arms 33 which are carried on the roof of the carriage 4" and the polarity of this magnet is arranged to be identical with the polarity of the magnets 31 so that there is a repelling magnetic force providing a magnetic support for the carriage 4".

The remaining elements of the linear induction motor are the same as in the other embodiments and include magnetic yokes 7", 7" and coils 8" which are formed integral with a casing 25 which is arranged within the interior of a ball and socket joint, the exterior comprising a supporting socket element 27 formed as a portion of the curved arms 33. This ball and socket joint forms a pivot axis at a similar to the other embodiments. The carriage 4"', is guided by electroconductive rollers 26' which extend upwardly from the casing 25 and bear against rail portions carried on the reaction rail 32. Driving or braking forces are transmitted by pressure rollers 28' which are carried on the magnetic casing 25 and which engage against an extension of the carriage 4"'.

On shorter stretches, with points and crossing, inside of cities for example, and along existing railway lines, the vehicle may run on auxiliary self-orienting wheels 35 similar to an ordinary ground supported train. In such event, either the normal double railway rails 16 or a central single rail 36 may be employed. When a central rail 36 is employed, the vehicle may run on the wheels 35 and in this case the suspension magnets 31 can be omitted especially for slow travel stretches.

The top supported vehicle of FIG. 3 can be protected against snowfall, ice formation, sandstorms or the like by a roof 14'. The roof 14' also ensures that no large birds or other animals will enter into the induction motor space.

The advantages of the vehicle of the invention are the following:

1. Contact—a free suspension on air pressure or magnetic bearing pressure gives small resistance and permits the achieving of very high speeds.

2. Good shock-absorbing conditions against track irregularities are present because of the airgap suspension.

3. The invention permits a propulsion system which is economical, silently operable and free of exhaust gases and in addition is easy to maintain and it will not rapidly wear out. In addition, it does not require the carrying of propulsion fuels.

4. The vehicle is able to swing into a natural inclined position when in a curve because of the articulation of the parts and the suspension system. 5. Derailing or overturning is made impossible by the low position of the center of gravity below a hinged guide or articulation which is normally above the top or roof of the vehicle and which extends along the reaction rail of the induction motor.

6. The vehicle and its propulsion system may be easily protected against adverse weather conditions such as snow, ice, hail, fog or sandstorms and against interference by animals.

What is claimed is:

1. A vehicle comprising a vehicle carriage, a linear induction motor for driving sand carriage including a fixed electroconductive metal reaction rail mounted above and said carriage and magnetic pole and current coil means located alongside said reaction rail, a trackway along which said carriage is moveable, and repelling means arranged between said trackway and said carriage producing a lifting force acting against said carriage and sustaining the weight thereof above said trackway and means articulating said carriage to said magnetic pole and coil means to permit pendular lateral swinging movement of said carriage relative to said trackway and said magnetic pole and current coil means about an axis located above the center of gravity of said carriage.

2. A vehicle, according to claim 1, wherein said repelling means arranged adjacent said carriage for producing a lifting force comprises a trackway having a magnet therealong, and magnetic means carried by said vehicle body and cooperable with said track magnet to define a driving motor for said vehicle body and being sufficient to provide a magnetic lift for said carriage to sustain it above the ground.

3. A vehicle, according to claim 1, including guide means associated with said magnetic pole and current coil means and bearing against said reaction rail, said magnetic pole and current coil means including a pole yoke arranged alongside each side of said reaction rail and spaced therefrom to define a magnetic gap, said guide means maintaining the operative spacing between said pole yoke and said reaction rail.

4. A vehicle, according to claim 3, wherein said guide means includes members which are electrically conductive and which contact said reaction rail, said reaction rail having electroconductive rail portions bonded to the side surface thereof over insulating material.

5. A vehicle, according to claim 1 including retractible wheel means carried by said vehicle body permitting operation of the vehicle on a railway trackway.

6. A vehicle, according to claim 1, including a protective roof overlying said magnetic pole and current coil means.

7. A vehicle, according to claim 1, including braking shoes adapted to be extended to engage said reaction rail for slowing the vehicle.

8. A vehicle, according to claim 1, wherein said reaction rail extends in a substantially vertical plane above said carriage said magnetic pole and current coil means including a pole yoke extending on each side of said reaction rail and a coil winding for said yoke, a casing mounting said coil winding and said pole yoke, conductive pickup contacts on said casing for receiving current for the coils from said reaction rail, said articulating means including means defining a pivotal connection between said carriage and said casing.

9. A vehicle, according to claim 8, wherein said articulating means includes a hinge pin pivoting joint support formed by the upper portion of said carriage, said casing defining a hinge pin member being pivotally suspended within said support.

10. A vehicle, according to claim 8, wherein said articulating means includes a pivot pin carried on said casing, said carriage being pivotally connected to said casing through said pivot pin.

11. A vehicle, according to claim 1, wherein said repelling means arranged adjacent said carriage for producing a lifting force acting against said carriage includes magnetic means carried on said reaction rail, said carriage having an extension overlying said magnetic means and having a magnet of the same polarity as said magnetic means and producing therewith a repelling force constituting said lifting force.

12. A vehicle, according to claim 1, wherein said repelling means adjacent said carriage for producing a lifting force acting against said carriage comprises a trackway supported on the ground, and compressed air means on said carriage for directing air under pressure between said carriage and said trackway in a quantity to maintain the spacing between said trackway and said carriage and for supporting the carriage above the ground.

13. A vehicle, according to claim 1, including a ground trackway located below said carriage, said lifting means arranged adjacent said carriage producing a lifting force acting against said carriage comprising magnetic means on said carriage and on said ground trackway producing a magnetic repelling force for lifting said carriage.

14. A free-suspended-vehicle driven and braked by linear electric induction motors, comprising a vehicle body, means defining trackway (1, 19, 31) having a laterally curved surface over which said vehicle body (4) is movable longitudinally and laterally without ground contact, repelling lifting means effective between said curved surface and said vehicle body for levitating said vehicle, a pendular hinge connected to said vehicle body having an axis (A) extending in the direction of vehicle body motion around which said vehicle body (4) can swing laterally, a linear induction motor (7, 8, 9, 25) having a substantially vertical electroconductive reaction rail and a relatively movable drive part (11, 26) alongside said rail serving as a lateral guidance for said vehicle, said drive part having a hinge (10, 25, 27) for said vehicle body defining a pendular axis for said body above the center of gravity of said carriage and serving as lateral guidance for said vehicle, said drive part (11, 26) running along without being supported vertically by the electroconductive vertical reaction rail (5, 24, 32) of said linear induction motor.

15. A vehicle, according to claim 14, wherein said trackway is enlarged outwardly in a curved path for sustaining the carriage during its transverse swinging movement.